(12) United States Patent
Berezansky et al.

(10) Patent No.: US 8,484,666 B2
(45) Date of Patent: Jul. 9, 2013

(54) OPTIMIZATIONS FOR IMPLEMENTING MULTI-STACK STACK HOSTS

(75) Inventors: Yury Berezansky, Haifa (IL); Moshe Sapir, Haifa (IL); Ben Bernstein, Tel Aviv (IL); Maxim Braitmaiere, Tel-Mond (IL)

(73) Assignee: Microsoft Corporation, Redmond, WA (US)

( * ) Notice: Subject to any disclaimer, the term of this patent is extended or adjusted under 35 U.S.C. 154(b) by 353 days.

(21) Appl. No.: 12/880,195

(22) Filed: Sep. 13, 2010

(65) Prior Publication Data
US 2012/0066695 A1 Mar. 15, 2012

(51) Int. Cl.
*G06F 3/00* (2006.01)
(52) U.S. Cl.
USPC .......................... 719/328; 719/330
(58) Field of Classification Search
USPC ................................ 719/328, 330
See application file for complete search history.

(56) References Cited

U.S. PATENT DOCUMENTS

| | | | |
|---|---|---|---|
| 6,421,738 B1 * | 7/2002 | Ratan et al. | 719/328 |
| 7,242,689 B2 * | 7/2007 | Ikemura et al. | 370/401 |
| 7,333,510 B1 | 2/2008 | Hies et al. | |
| 7,340,746 B2 | 3/2008 | Deshpande | |
| 2001/0040895 A1 * | 11/2001 | Templin | 370/466 |
| 2004/0093434 A1 | 5/2004 | Hovell et al. | |
| 2005/0015507 A1 | 1/2005 | Chin | |
| 2005/0034131 A1 * | 2/2005 | Deshpande | 719/310 |
| 2005/0175016 A1 * | 8/2005 | Kim et al. | 370/395.52 |
| 2005/0182829 A1 | 8/2005 | King et al. | |
| 2006/0104226 A1 | 5/2006 | Ahn | |
| 2009/0282471 A1 * | 11/2009 | Green et al. | 726/12 |

OTHER PUBLICATIONS

Nordmark, Stateless IP/ICMP Translation Algorithm, Feb. 2000.*
Dennis Ludwig, Aeronautical Systems Center, Jun. 20, 2007.*
Stahl, David, "IPv6 Transition Methods", Retrieved at <<ciscoblog.globalknowledge.com/2009/11/24/ipv6-transition-met>, Nov. 24, 2009.
Rooney, Tim, "IPv4-to-IPv6 Transition Strategies", Retrieved at <<networkworld.com/.../bt_wp_IPv6_Transition_Strategies.pdf >>, Feb. 2007.
"NAT-PT", <<retrieved at eurescom.de/~public-webspace/P1000-series/P1009/doc3_1.html>>, Jun. 8, 2002.

* cited by examiner

*Primary Examiner* — Lechi Truong

(57) ABSTRACT

Architecture that includes optimizations for "Bump-in-the-API" (BIA) as employed for multi-stack hosts. These optimizations reduce the limitations imposed by the existing translation technologies by simplifying the implementation and addressing possible compatibility issues. More specifically, the architecture discloses optimizations that use a preconfigured NAT64 prefix for mapping of NAT64 IPv6 addresses in the prefix subnet to IPv4 addresses, without a mapping table (stateless), use configuration information for enabling API translation per application (resolves possible compatibility issues), and use a local IPv4 socket and a data pump to reduce the number of translated API calls.

19 Claims, 5 Drawing Sheets

OPTIMIZATIONS FOR IMPLEMENTING MULTI-STACK STACK HOSTS

BACKGROUND

As technology continues to evolve, there is a never-ending need for transition mechanisms that bridge the gap between legacy and newer architectures. Dual stacks can function as a transition mechanism between these architectures. In one specific transition example for IP (Internet protocol) addresses, a technique called "Bump-in-the-API" (BIA) is employed for multi-stack hosts to transition between IPv4 and IPv6 hosts. For example, this enables hosts to communicate with other IPv6 hosts using existing IPv4 applications. However, a translator is involved and requires one or more tables to be created and utilized to facilitate the transition processing.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes optimizations for "Bump-in-the-API" (BIA) as employed for multi-stack hosts. These optimizations reduce the limitations imposed by the existing translation technologies by simplifying the implementation and addressing possible compatibility issues. This is accomplished by applying a well-defined reversible stateless transformation for different transport address versions such as IPv4 and IPv6. In a specific implementation, the architecture discloses optimizations that use a preconfigured NAT64 prefix for mapping of NAT64 IPv6 addresses in the prefix subnet to IPv4 addresses, without a mapping table (stateless), use configuration information for enabling API translation per application (resolves possible compatibility issues), and use a local IPv4 socket and a data pump to reduce the number of translated API calls.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
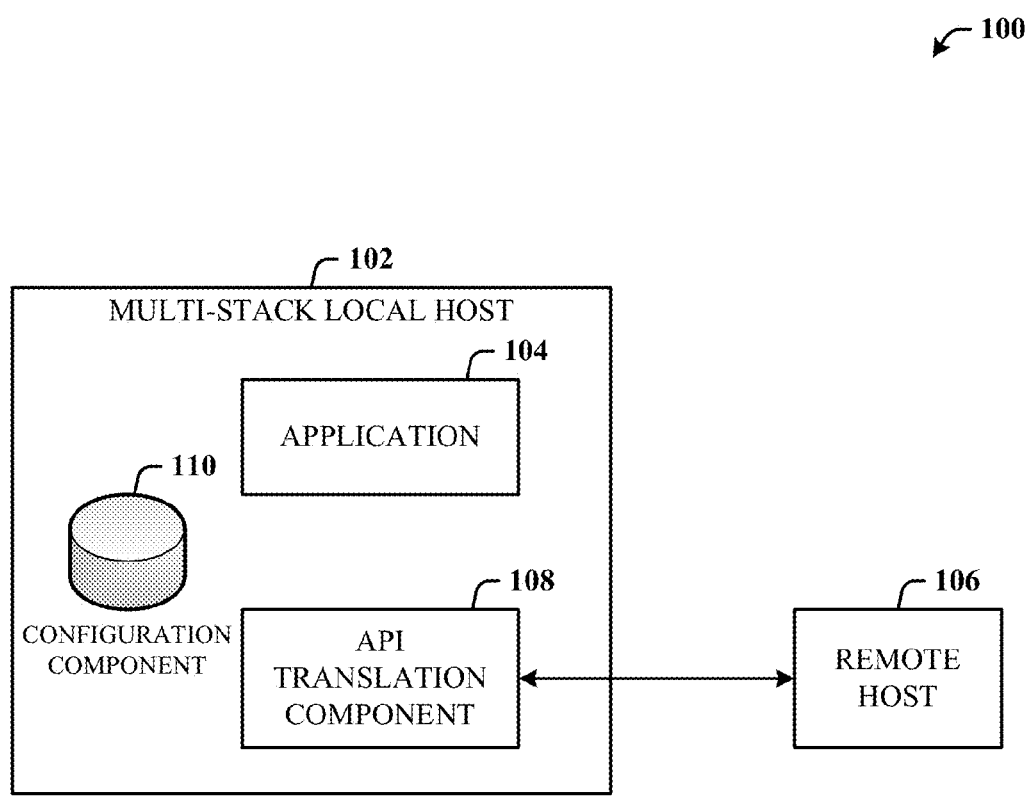
FIG. 1 illustrates a system in accordance with the disclosed architecture.

The disclosed architecture introduces optimizations for "Bump-in-the-API" (BIA) implementations of multi-stack hosts and address possible compatibility issues between hosts of different IP infrastructures (e.g., IPv4 and IPv6). Specifically, the optimizations include, but are not limited to, a well-defined reversible stateless transformation that when implemented performs address mapping between disparate transport address versions (e.g., IPv4 and IPv6). In one specific reversible stateless transformation technique for NAT64 (provides network address translation (NAT) from IPv6 to IPv4 networks), IPv6 addresses use a preconfigured NAT64 prefix for mapping of NAT64 IPv6 addresses in the prefix subnet to IPv4 addresses without a mapping table (stateless), use application configuration information that for enables API translation per application (and possible compatibility issues), and optimize function mapping using a local IPv4 socket and data pump to reduce the number of translated API (application programming interface) calls.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 includes a multi-stack local host 102 having an application 104 of a first transport address version application program interface (API) that seeks communication with a remote host 106 of a second transport address version API. The system 100 can also include an API translation component 108 that facilitates the communication between the application 104 and the remote host 106 based on automatic reversible stateless transport address version translation between the local host 102 and the remote host 106, application configuration information, and a localized transport address version socket.

As described in greater detail hereinbelow, the local host 102 can further comprise a configuration component 110 from which the API translation component 108 accesses the configuration information associated with the application to determine if translation is needed for the application. The API translation component 108 can further comprise an address mapper that performs the transport address version translation. The address mapper reconstructs a second transport address version (e.g., IPv6) into a first transport address version (e.g., IPv4) by stripping a prefix from the second transport address version and adding the prefix to the first transport address version. This translation operation is performed statelessly, in that, no address mapping table is utilized.

The API translation component 108 can further comprise a connect mapper that intercepts a function call to connect to a transport address, creates a local connect socket, and establishes a connection with the remote host 106 via the local connect socket. The connect mapper creates a listening socket that monitors communications between the remote host 106 and the application 104 via the local connect socket.

Figure 2:
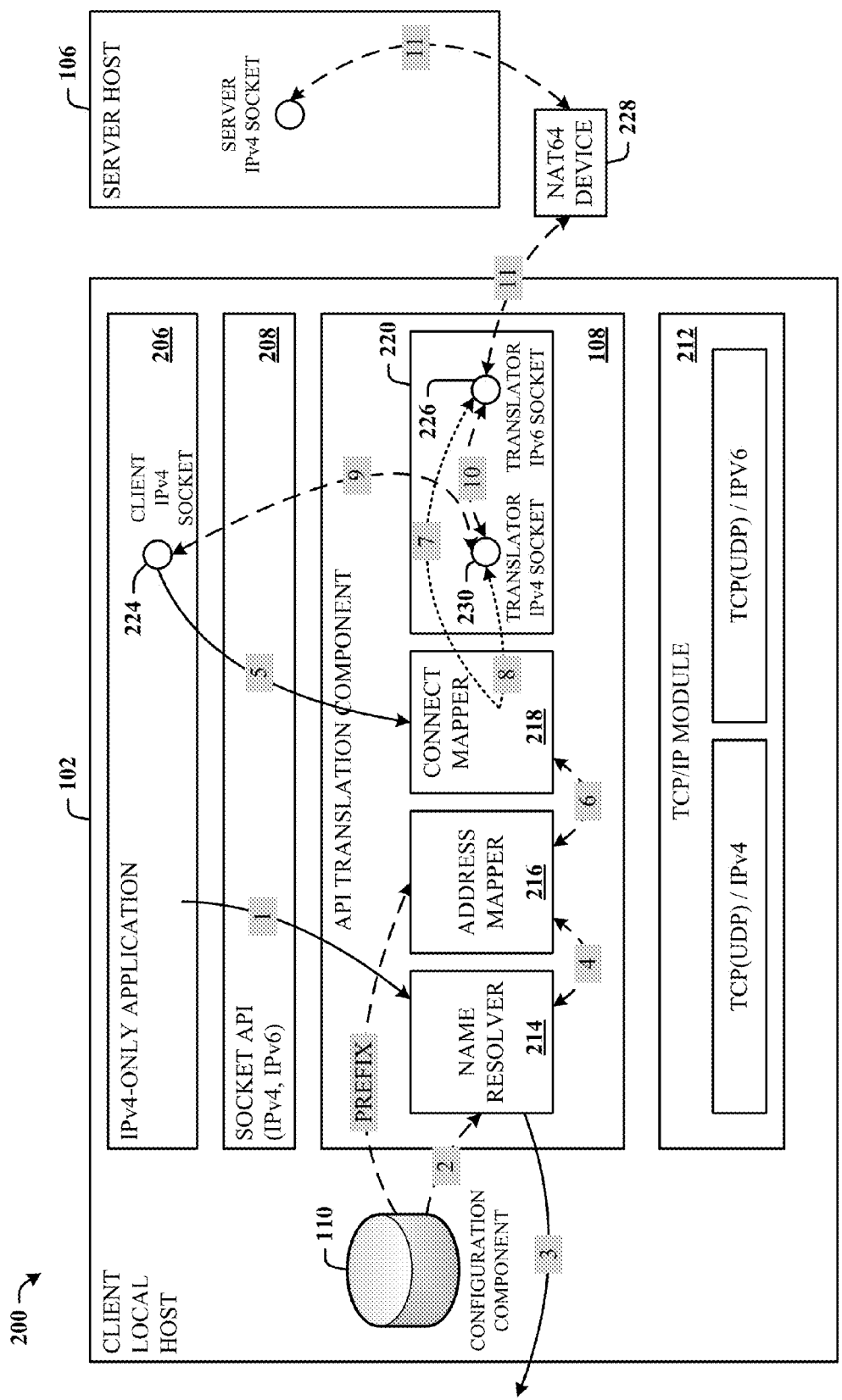
FIG. 2 illustrates a system for that performs optimized translation between the dual-stack local host and the server host of different addressing structures.

FIG. 2 illustrates a system 200 for that performs optimized translation between the dual-stack local host 102 and the server host 106 of different addressing structures. In FIG. 2, the legend for arrowing lines is as follows: a solid line indicates an API call/protocol message, a dashed line indicates data flow, and a dotted line indicates a relation. The scenario of FIG. 2 includes a bump-in-the-API (BIA) strategy that performs translation between IPv4 and IPv6 APIs, for example. Although described in the context of IPv4 and IPv6, it is to be understood that the disclosed architecture applies to other transport address versions as well. The local host 102 includes an IPv4-only application 206 (e.g., the application 104), a socket API 208, and the API translation component 108. The API translation component 108 is inserted between the socket API 208 and a TCP (transmission control protocol)/IP (Internet protocol) module 212 in the dual-stack host (the local host 102) to translate the IPv4 socket API function into an IPv6 socket API function, and to translate the IPv6 socket API function into an IPv4 socket API function. The TCP/IP module 212 is shown as including the TCP (UDP—user datagram protocol)/IPv4 and TCP (UDP)/IPv6 stacks.

The API translation component 108 includes other components such as a name resolver 214, an address mapper 216, a connect mapper 218, and a data pump 220. When an IPv4-only client application (e.g., application 104) connects to an IPv6 server (e.g., server host 106), the server host may actually be an IPv4-only server behind a NAT64 device 228 (a device that provides network address translation from IPv6 to IPv4 networks).

Obtaining and knowing the NAT64 prefix, the address mapper 216 can create an IPv4 address by stripping this prefix from an IPv6 address and then reconstructing the IPv6 address by adding the prefix to the IPv4 address. This is a stateless (no mapping table required) process.

This stateless reversible transformation technique can be used for reducing usage of an IPv4 address pool and the size of any mapping table used for specific purposes. For example, the address mapper 216 can use this technique for IPv6 addresses which match the configured NAT64 prefix and use the pool for other addresses. Alternatively, if the functionality is required only for NAT64 addresses which share the same prefix, the pool and the mapping table components may be eliminated altogether.

Another conventional limitation is that mappings are created based on name resolution, and therefore, do not support IPv4-only applications that do not perform name resolution and attempt connection to a server using a pre-configured IPv4 address. Assuming the IPv4 server host 106 is accessible through the NAT64 device 228, the address mapper 216 can construct an IPv6 address by deconstructing the IPv6 address into an IPv4 address, obtain the prefix, and then add the configured NAT64 prefix to the IPv4 address for IPv4 compatibility.

In operation, at 1, the application 206 initiates an IPv4 name resolution call. At 2, the API translation component 108 consults the configuration information for the application 206 stored in the configuration component 110 to determine whether to intercept the call for this application 206. At 3, the API translation component 108 performs IPv6 name resolution using the name resolver component 214. At 4, the API translation component 108 deduces the IPv4 address using the NAT64 prefix. At 5, the application 206 creates an IPv4 socket 224 (a socket being structured by an IP address and a port number) and performs a connect( ) API call via the connect mapper component 218.

At 6, the API translation component 108 reconstructs the IPv6 address using the NAT64 prefix. At 7, the API translation component 108 creates an IPv6 socket 226 as part of a data pump 220 and connects to the destination host 106 behind a NAT64 device 228. At 8, the API translation component 108 creates a local IPv4 listening socket 230 and allows the application 206 to connect to the listening socket 230. At 9, the application 206 communicates with the local IPv4 listening socket 230 created by the API translation component 108. At 10, the API translation component 108 pumps the data between the IPv4 listening socket 230 and the IPv6 socket 226 using the data pump 220. At 11, the API translation component 108 communicates with the destination host 106 behind the NAT64 device 228.

In other words, in the context of IPv4 and IPv6 transport addressing, for example, the optimization of address mapping for NAT64 IPv6 addresses includes the address mapper which is responsible for maintaining a table of pairs of an IPv4 address and an IPv6 address. The IPv4 addresses are assigned from an IPv4 address pool consisting of private addresses. When the number of IPv4 applications communicating with IPv6 hosts is large, the available address spaces might be exhausted and smart techniques might be required for managing the pool. We propose a solution which may reduce the pool use or, with the limitation discussed below, eliminate the pool altogether.

In some cases, interfering with the API stack may lead to undesirable results. For example, supporting connections without prior name resolution by assuming the IPv4 address is "NAT64-able" may result in problems. In case this assumption is wrong (e.g., the IPv4 address actually belongs to an IPv4 host in the same network and no API translation is actually required interfering with the API will break the application), application configuration information created and maintained to enable or disable API translation on a per-application basis. For example, this can be accomplished by specifying an include or exclude list of executable files in the configuration component 110 for which the API translation will apply.

The disclosed architecture also creates and utilizes the local listening socket 230 for optimizing function mapping. When the application 206 (or application 104) creates a socket and attempts to connect to an IPv4 address (step 5 in FIG. 2), the connect( ) function call is intercepted by the API translator component 108. At this point, the connect mapper component 218 obtains an IPv6 address from the address mapper component 216, creates the IPv6 socket 226, and then establishes a connection with the destination host (step 7 in FIG. 2).

The connect mapper component 218 then creates the IPv4 listening socket 230 to listen on the IPv4 loopback address on a dynamically allocated port X (step 8 in the diagram). The connect mapper component 218 changes the IPv4 destination address in the connect call to 127.0.0.1:X and lets the default socket API implementation to continue handling the call. The socket API 208 connects to 127.0.0.1:X and the connect mapper component 218 accepts this connection. The control then is returned to the application 206.

From the perspective of the application 206, connection is directly to the remote host 106 (when actually connected to the API connect mapper component 218) and starts communication (step 9 in FIG. 2). In turn, the API connect mapper component 218 has sockets to both the local IPv4 application and the remote IPv6 host and can start a data pump (step 10 in FIG. 2). This results in the application 206 exchanging data with the remote host 106 (step 11).

Using this technique, only the connect( ) function and some auxiliary functions like getpeername( ) are modified. Functions that actually transfer data do not require modification. For UDP the operation is similar, except that the API translator sockets creation is delayed till sendto( ) or recvfrom( ) call. Even then the actual data transfer is handled by the default API implementation.

Put another way, a computer-implemented system is provided that includes a multi-stack local host having an application of a first transport address version API that seeks communication with a remote host of a second transport address version API, a configuration component that stores application configuration information accessible for a given application seeking communications with the remote host, and an API translation component that facilitates the communication between the application and the remote host. The API translation component is associated with or includes a name resolver component that performs name resolution based on the application configuration information, an address mapper component that statelessly deduces and reconstructs an address of the first transport address version into an address of the second transport address version, and a connect mapper component that creates sockets for the application and the remote host via which the application communicates with the remote host.

The connect mapper component creates a data pump with an application listening socket and remote host socket that enables communications between the application and the remote host. The address mapper component performs transport address version translation. The address mapper reconstructs a second transport address version into a first transport address version by stripping a prefix from the second transport address version and adding the prefix to the first transport address version. The first transport address version is IPv4 and the second transport address version can be IPv6, for example. The prefix is based on a network address translation device imposed between the remote host and the application. The application can be of the first transport address version that seeks to communicate with remote host which is of the first transport address version, via a network address translation component. The stack can be based on the bump-in-the-API technology.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
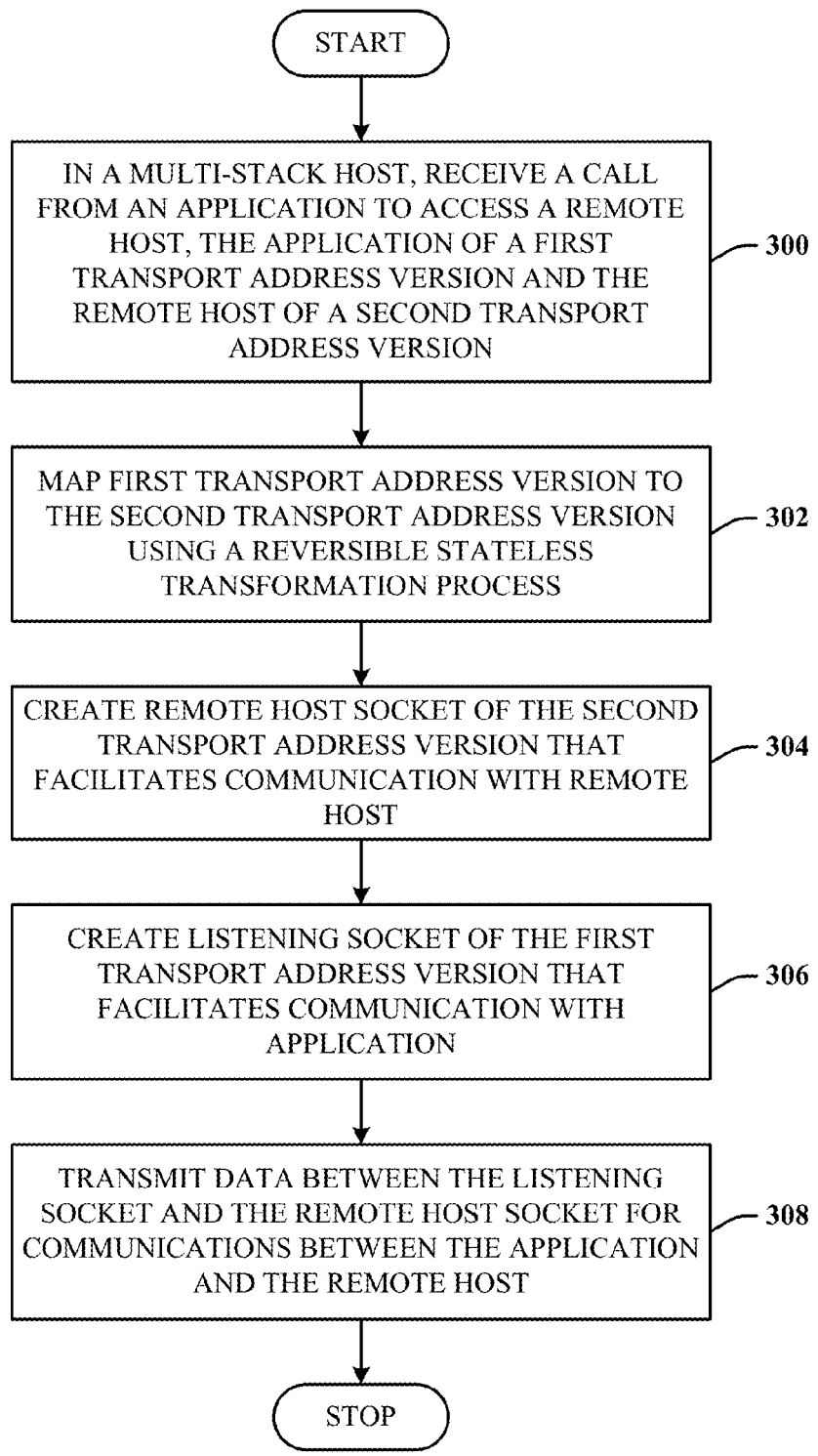
FIG. 3 illustrates a computer-implemented method in accordance with the disclosed architecture.

FIG. 3 illustrates a computer-implemented method in accordance with the disclosed architecture. At 300, in a multi-stack host, a call is received from an application to access a remote host, the application of a first transport address version and the remote host of a second transport address version. At 302, the first transport address version is mapped to the second transport address version using a reversible stateless transformation process (e.g., using a prefix from the first transport address version, and without using a mapping table). At 304, a remote host socket of the second transport address version is created that facilitates communication with remote host. At 306, a listening socket of the first transport address version is created that facilitates communication with application. At 308, data is transmitted between the listening socket and the remote host socket for communications between the application and the remote host.

Figure 4:
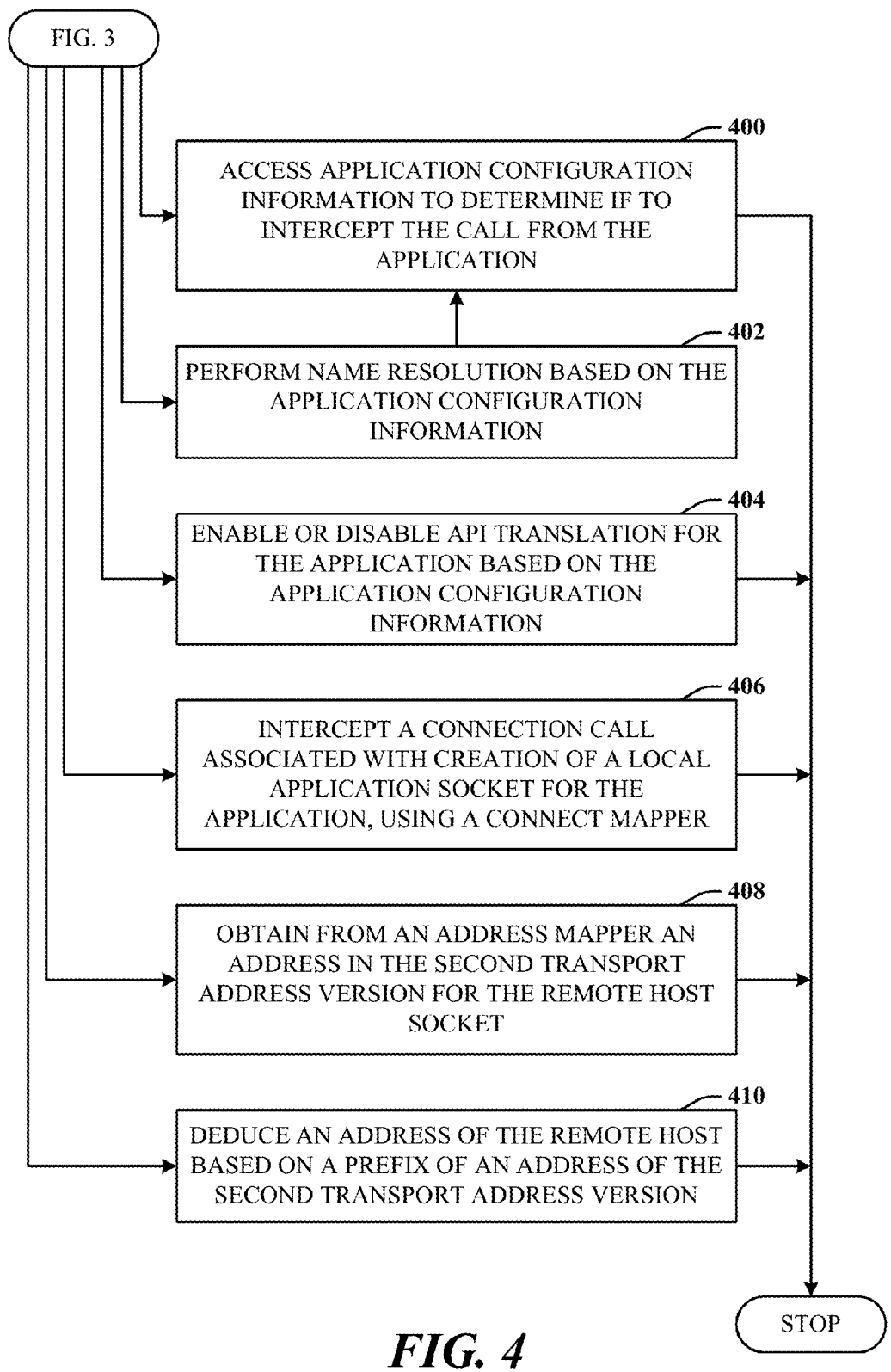
FIG. 4 illustrates further aspects of the method of FIG. 3.

FIG. 4 illustrates further aspects of the method of FIG. 3. Note that the arrowing indicates that each block represents a step that can be included, separately or in combination with other blocks, as additional aspects of the method represented by the flow chart of FIG. 3. At 400, application configuration information is accessed to determine if to intercept the call from the application. At 402, name resolution is performed based on the application configuration information. At 404, API translation is enabled or disabled for the application based on the application configuration information. At 406, a connection call associated with creation of a local application socket for the application, is intercepted using a connect mapper. At 408, an address in the second transport address version is obtained from an address mapper for the remote host socket. At 410, an address of the remote host is deduced based on a prefix of an address of the second transport address version.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 5:
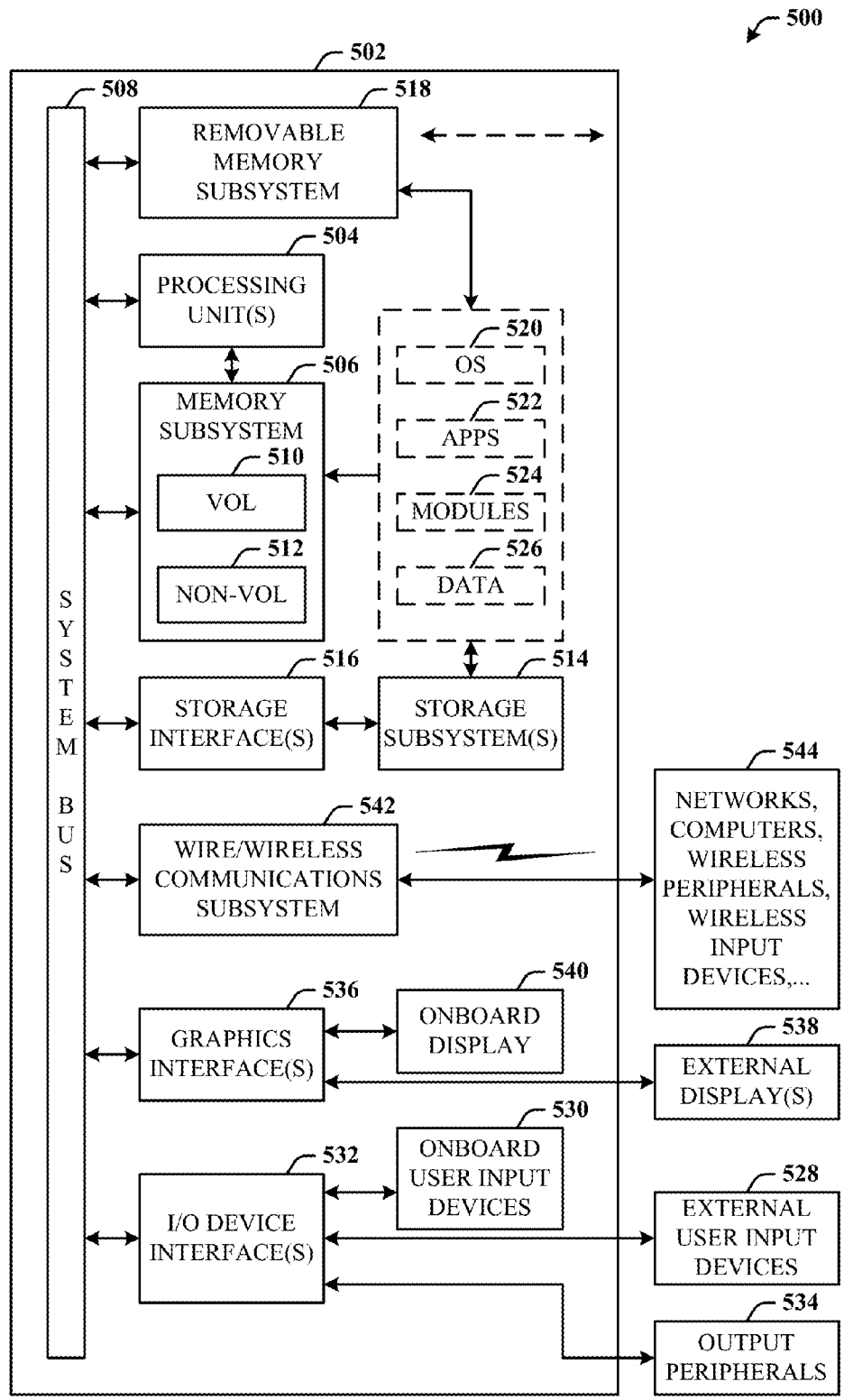
FIG. 5 illustrates a block diagram of a computing system that executes optimization for multi-stack hosts in accordance with the disclosed architecture.

Referring now to FIG. 5, there is illustrated a block diagram of a computing system 500 that executes optimization for multi-stack hosts in accordance with the disclosed architecture. In order to provide additional context for various aspects thereof, FIG. 5 and the following description are intended to provide a brief, general description of the suitable computing system 500 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 500 for implementing various aspects includes the computer 502 having processing unit(s) 504, a computer-readable storage such as a system memory 506, and a system bus 508. The processing unit(s) 504 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 506 can include computer-readable storage (physical storage media) such as a volatile (VOL) memory 510 (e.g., random access memory (RAM)) and non-volatile memory (NON-VOL) 512 (e.g., ROM, EPROM, EEPROM, etc.). A basic input/output system (BIOS) can be stored in the non-volatile memory 512, and includes the basic routines that facilitate the communication of data and signals between components within the computer 502, such as during startup. The volatile memory 510 can also include a high-speed RAM such as static RAM for caching data.

The system bus 508 provides an interface for system components including, but not limited to, the system memory 506 to the processing unit(s) 504. The system bus 508 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 502 further includes machine readable storage subsystem(s) 514 and storage interface(s) 516 for interfacing the storage subsystem(s) 514 to the system bus 508 and other desired computer components. The storage subsystem(s) 514 (physical storage media) can include one or more of a hard disk drive (HDD), a magnetic floppy disk drive (FDD), and/or optical disk storage drive (e.g., a CD-ROM drive DVD drive), for example. The storage interface(s) 516 can include interface technologies such as EIDE, ATA, SATA, and IEEE 1394, for example.

One or more programs and data can be stored in the memory subsystem 506, a machine readable and removable memory subsystem 518 (e.g., flash drive form factor technology), and/or the storage subsystem(s) 514 (e.g., optical, magnetic, solid state), including an operating system 520, one or more application programs 522, other program modules 524, and program data 526.

The one or more application programs 522, other program modules 524, and program data 526 can include the entities and components of the system 100 of FIG. 1, the entities and components of the system 200 of FIG. 2, and the methods represented by the flowcharts of FIGS. 3 and 4, for example.

Generally, programs include routines, methods, data structures, other software components, etc., that perform particular tasks or implement particular abstract data types. All or portions of the operating system 520, applications 522, modules 524, and/or data 526 can also be cached in memory such as the volatile memory 510, for example. It is to be appreciated that the disclosed architecture can be implemented with various commercially available operating systems or combinations of operating systems (e.g., as virtual machines).

The storage subsystem(s) 514 and memory subsystems (506 and 518) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 502 and includes volatile and non-volatile internal and/or external media that is removable or non-removable. For the computer 502, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 502, programs, and data using external user input devices 528 such as a keyboard and a mouse. Other external user input devices 528 can include a microphone, an IR (infrared) remote control, a joystick, a game pad, camera recognition systems, a stylus pen, touch screen, gesture systems (e.g., eye movement, head movement, etc.), and/or the like. The user can interact with the computer 502, programs, and data using onboard user input devices 530 such a touchpad, microphone, keyboard, etc., where the computer 502 is a portable computer, for example. These and other input devices are connected to the processing unit(s) 504 through input/output (I/O) device interface(s) 532 via the system bus 508, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 532 also facilitate the use of output peripherals 534 such as printers, audio devices, camera devices, and so on, such as a sound card and/or onboard audio processing capability.

One or more graphics interface(s) 536 (also commonly referred to as a graphics processing unit (GPU)) provide graphics and video signals between the computer 502 and external display(s) 538 (e.g., LCD, plasma) and/or onboard displays 540 (e.g., for portable computer). The graphics interface(s) 536 can also be manufactured as part of the computer system board.

The computer 502 can operate in a networked environment (e.g., IP-based) using logical connections via a wired/wireless communications subsystem 542 to one or more networks and/or other computers. The other computers can include workstations, servers, routers, personal computers, microprocessor-based entertainment appliances, peer devices or other common network nodes, and typically include many or all of the elements described relative to the computer 502. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 502 connects to the network via a wired/wireless communication subsystem 542 (e.g., a network interface adapter, onboard transceiver subsystem, etc.) to communicate with wired/wireless networks, wired/wireless printers, wired/wireless input devices 544, and so on. The computer 502 can include a modem or other means for establishing communications over the network. In a networked environment, programs and data relative to the computer 502 can be stored in the remote memory/storage device, as is associated with a distributed system. It will be appreciated that the network connections shown are exemplary and other means of establishing a communications link between the computers can be used.

The computer 502 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system, comprising:
a computer having a processor and a memory, the memory having:
a multi-stack local host, having an application of a first transport address version application program interface (API) that seeks communication with a remote host of a second transport address version API; and
an API translation component that facilitates the communication between the application and the remote host based on automatic stateless transport address version translation between the local host and the remote host, application configuration information that determines if API translation is needed for the application, and a localized transport address version socket that creates a listening connection between the API translation component and the application, the API translation component including an address mapper that performs the automatic stateless transport address version translation without an address table by reconstructing a second transport address version into a first transport address version by stripping a prefix from the second transport address version and adding the prefix to the first transport address version.

2. The system of claim 1, wherein the prefix is a NAT64 prefix.

3. The system of claim 1, wherein the second transport address version pertains to IPv6 and the first transport address version pertains to IPv4.

4. The system of claim 1, wherein the API translation component comprises a connect mapper that intercepts a function call to connect to a transport address, creates a local connect socket, and establishes a connection with the remote host via the local connect socket.

5. The system of claim 4, wherein the connect mapper creates a listening socket that monitors communications between the remote host and the application via the local connect socket.

6. A computer-implemented system, comprising:
a computer configured as a multi-stack local host, the multi-stack local host having a processor and a memory, the memory having:
an application of a first transport address version application program interface (API) that seeks communication with a remote host of a second transport address version API;
a configuration component that stores application configuration information accessible for a given application seeking communications with the remote host, the configuration component determines if API translation is needed for the application; and
an API translation component that facilitates the communication between the application and the remote host, the API translation component associated with,
a name resolver component that performs name resolution based on the application configuration information;
an address mapper component that statelessly deduces and reconstructs an address of the first transport address version into an address of the second transport address version, the address mapper reconstructing the second transport address version into the first transport address version by stripping a prefix from the second transport address version and adding the prefix to the first transport address version; and
a connect mapper component that creates sockets for the application and the remote host via which the application communicates with the remote host.

7. The system of claim 6, wherein the connect mapper component creates a data pump with an application listening socket and remote host socket that enables communications between the application and the remote host.

8. The system of claim 6, wherein the prefix is a NAT64 prefix.

9. The system of claim 8, wherein the first transport address version is IPv4 and the second transport address version is IPv6.

10. The system of claim 8, wherein the prefix is based on a network address translation device imposed between the remote host and the application.

11. The system of claim 6, wherein the application is of the first transport address version that seeks to communicate with remote host which is of the first transport address version, via a network address translation component.

12. The system of claim 6, wherein the stack is based on a bump-in-the-API technology.

13. A computer-implemented method executed by a processor, comprising:
in a multi-stack host, receiving a socket application programming interface (API) call from an application to access a remote host, the application of a first transport address version and the remote host of a second transport address version;
accessing application configuration information to determine to whether to intercept the socket API call from the application;
mapping the first transport address version to the second transport address version using a reversible stateless transformation process that reconstructs the second transport address version into the first transport address version by stripping a prefix from the second transport address version and adding the prefix to the first transport address version;
creating a remote host socket of the second transport address version that facilitates communication with remote host;
creating a listening socket of the first transport address version that facilitates communication with application; and
transmitting data between the listening socket and the remote host socket for communications between the application and the remote host.

14. The method of claim 13, further comprising performing name resolution based on the application configuration information.

15. The method of claim 13, further comprising enabling or disabling API translation for the application based on the application configuration information.

16. The method of claim 13, further comprising intercepting a connection call associated with creation of a local application socket for the application, using a connect mapper.

17. The method of claim 13, further comprising obtaining from an address mapper an address in the second transport address version for the remote host socket.

18. The method of claim 13, wherein the first transport address version is IPv4 and the second transport address version is IPv6.

19. The method of claim 13, wherein the prefix is a NAT64 prefix.

* * * * *